Dec. 26, 1967  S. H. G. ENKVIST  3,360,177
TUBE WELDING APPARATUS

Filed April 13, 1965

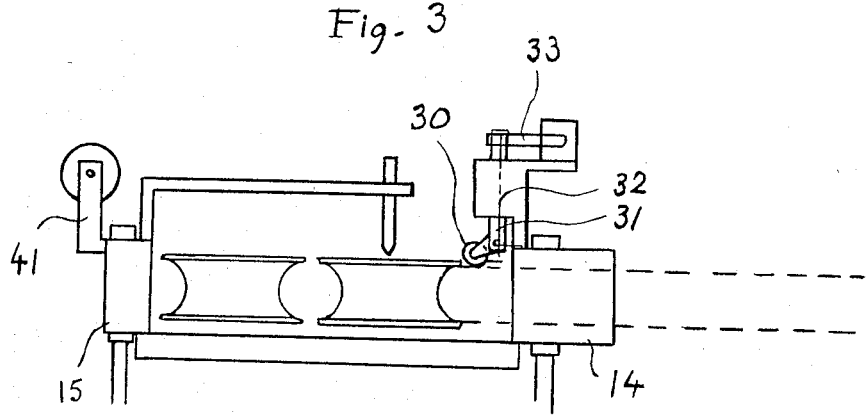
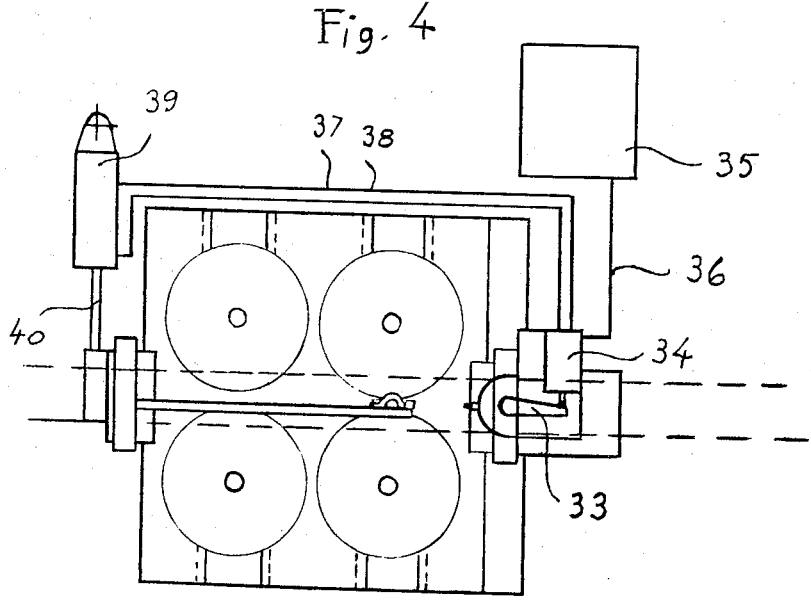

United States Patent Office 3,360,177
Patented Dec. 26, 1967

3,360,177
TUBE WELDING APPARATUS
Sven Holger Göthe Enkvist, Sandviken, Sweden, assignor to Sandvikens Jernverks Aktiebolag, Sandviken, Sweden, a corporation of Sweden
Filed Apr. 13, 1965, Ser. No. 447,623
Claims priority, application Sweden, Apr. 16, 1964, 4,675/64
6 Claims. (Cl. 228—9)

ABSTRACT OF THE DISCLOSURE

A jointing device for progressively welding the longitudinally extending slit in a tube following formation of the tube from flat strip material to establish a longitudinal seam as the tube moves longitudinally of itself from the tube forming means comprises pressure rolls and a welding device mounted on a frame which in turn is rotatably mounted about the axis of the tube rather than vice versa since the torque for rotating the frame is less than that required to rotate the tube. A feeler device, in the form of a plate or disc entering the tube slit, and located in advance of the frame, follows any lateral deviation of the slit as the tube comes from the tube former and movement of the feeler is converted in a corresponding rotary adjustment of the frame and welding device to maintain the welding means in alignment with the tube slit.

---

The manufacture of tubes by longitudinal seam welding is started from strip material which is bent to tubular shape by means of rolls after which the longitudinal joint is welded. Adjacent the point of welding the tube is guided by a jointing device which, besides the welding means, comprises pressure rolls which press together the edges of the welding joint. In manufacturing tubes in this way the joint has a tendency to move somewhat laterally due to minor turning of the tube and thus to deviate in either direction from the desired position in relation to the welding apparatus and pressure rolls. In order to prevent this, in previous devices, a torque has been applied to the tube for maintaining the joint in the desired lateral position. Because of the firm grip with which the tube is held by the rolls which form the tube from the flat strip, the correcting torque must be relatively large. It must also be applied against the edges of the open welding joint, whereby the edges are subjected to an undesired deformation.

The invention resides in an improvement in earlier known methods and devices consisting in that the sidewise movements of the joint are permitted and no attempt is made to correct the position of the joint. Instead, the pressure rolls and the welding apparatus are mounted on a frame which can swing around the axis of the tube and follow the rotational movements of the tube, thereby performing the welding at the correct place. Only a minor force is necessary for moving the pressure rolls and welding apparatus.

Details and further advantages of the invention appear from the following specification and drawings showing:

FIGS. 3 and 4 show the same jointing apparatus as in FIGS. 1 and 2 with a hydraulic servo mechanism for swinging the pressure rolls and welding apparatus.

Figure 1:
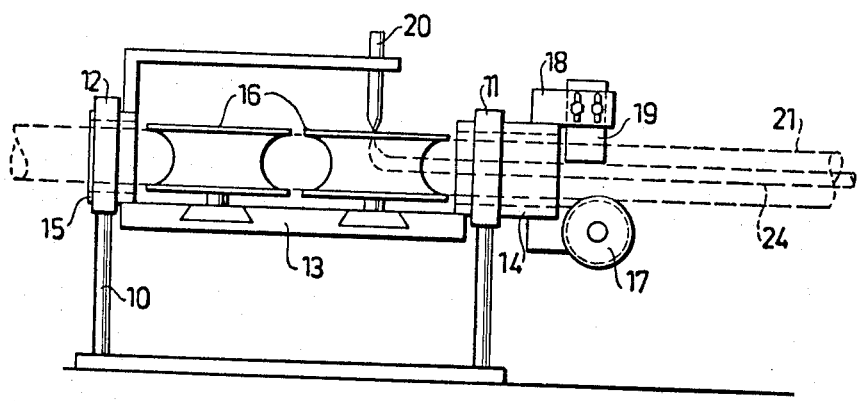
FIG. 1 is a longitudinal section of a jointing machine according to the invention.

The jointing machine consists of a frame 10 having journal sleeves 11 and 12, in which are rotatably journalled sleeve shaped tubular journal taps 14 and 15. On the journal taps a table 13 is mounted which can pivot on the taps in the sleeves and on which are mounted vertical stub shafts carrying rotatable pressure rolls 16. In the illustrated case there are four such rolls, but often two are sufficient. On the journal tap 14 there is mounted a supporting roll 17 serving as a support for the tube which is welded. The journal tap 14 is also provided with guiding means consisting of a holder 18 with a feeler plate 19, which enters the open tube slit. This feeler plate can also consist of one or more circular thin plates which enter the tube slit and are rotatably journalled on the holder 18. A welding burner 20 is carried on a bracket protruding from the journal tap 15. The tube 21 which is being welded and the welding joint 22 are marked with broken lines. The tube passes through the journal taps 14 and 15 coaxially with them and passes between the pressure rolls 16, the welding joint being positioned below the burner 20. The tube is fed in the direction indicated by the arow 23. The series of rolls which bend the strip to the tubular shape are not shown and are supposed to lie at the right side in the figures.

If the welding joint 22 moves laterally, the tube occasionally turning around its axis during the feeding, the feeler 19 which enters the joint 22 will follow the movement. As the feeler 19 is firmly connected with the pivoted table 13 the table together with the pressure rolls 16 and the welding burner 20 join the turning movement and the welding and pressing will be performed at the desired place. If the welding is done by means of gas, a gas conduit 24 can be placed within the tube 21 and can be connected to the pivoting table in order to follow the turning swinging, as it is important that the opening of the gas conduit is directed towards the slit. The conduit 24 can for instance be hung upon the guide plate 19.

In the described device a guiding torque is required, the size of which is determined by the inertia of the pivoting table plus the friction in the bearings. This torque is substantially smaller than what was needed in previous devices for turning the tube to alignment with the apparatus. Hereby is avoided deformation of the edges of the slit and a better welding joint is obtained.

Figure 2:
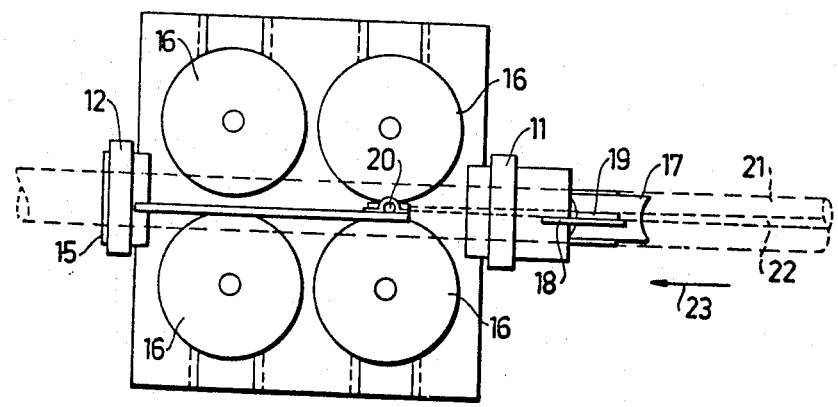
FIG. 2 is a top elevational view of the same jointing machine.

The device can be adapted also for a further reduction of the force against the slit by not coupling the guiding means rigidly to the table but inserting a servo mechanism between the guiding means and the table. This is illustrated in FIGS. 3 and 4, showing a device similar to the one in FIGS. 1 and 2 with regard to all details except the means for transferring lateral movement of the slit to the pivoting table. A feeler wheel 30 is journalled on a lever arm on a vertical rod 31 which can turn in a sleeve 32 mounted on the journal tap 14 and at its upper end has a lever arm 33 which is coupled to a valve 34. The valve is supplied with a pressure medium from a pressure source 35 through a conduit 36 and has two conduits 37 and 38 leading to a piston device 39 with a piston 40 acting on a lever arm 41 rigidly connected to the table. The units of the servo system are shown only diagrammatically, because any person skilled in the art will realize how they are built and how they work. The wheel 30 enters into the slit in the tube. When the slit moves laterally in either direction the wheel 30 follows the movement and actuates the valve 34, so that pressure medium is supplied from the source 35 through the conduit 36 and the valve 34 and through the conduit 37 for one direction and conduit 38 for the other direction, so that the piston system 39, 40 adjusts the pivoting table to the changed lateral position of the slit.

The described hydraulic system can be substituted by an equivalent electric system. The feeler device is illustrated as a plate or a wheel entering the slit of the tube but it can be substituted by electrical feelers, for instance photoelectric means, or pneumatic feeler means of known construction, which eliminates all mechanical action between the edges of the slit and the feeler means.

For the welding procedure different methods are possible such as welding with an argon arc or high frequency welding. For stainless tubes for instance an argon arc with tungsten electrode can be used.

I claim:

1. In a jointing device for progressively welding the longitudinally extending slit in a tube following formation of the tube from flat strip material to establish a longitudinal seam as the tube moves longitudinally of itself from the tube forming means, the combination comprising pressure rolls and welding means mounted on a frame which in turn is rotatably mounted about the axis of said tube, the torque for rotating said frame being less than that required to rotate the tube, a feeler means located in advance of said frame and which is arranged to follow any lateral deviation of said tube slit as the tube comes from the tube former, and means interconnecting said feeler means and frame to effect a corresponding rotary adjustment of said frame and welding means thereon thereby to maintain said welding means in alignment with the tube slit.

2. A jointing device as defined in claim 1 wherein said interconnecting means between said feeler means and frame is constituted by a rigid connection therebetween.

3. A jointing device as defined in claim 1 wherein said interconnecting means between said feeler means and frame is constituted by a servo-mechanism.

4. A jointing device as defined in claim 1 wherein said feeler means comprises at least one plate entering the tube slit.

5. A jointing device as defined in claim 1 wherein said feeler means comprises at least one rotatable disc entering the tube slit.

6. A jointing device as defined in claim 1 wherein said feeler means comprises non-mechanical means for following the lateral position of the tube slit.

References Cited

UNITED STATES PATENTS 3,075,484   1/1963   Benteler _____ 29—477

JOHN F. CAMPBELL, *Primary Examiner.*

M. L. FAIGUS, *Assistant Examiner.*